United States Patent [19]

Tsunoda et al.

[11] Patent Number: 5,290,148
[45] Date of Patent: Mar. 1, 1994

[54] HIGH HEAD PUMP-TURBINES

[75] Inventors: Sachio Tsunoda; Hiroshi Tanaka; Ichiro Yamagata, all of Yokohama; Shigeto Fujiki, Fujimi; Yoshikazu Kobayashi, Ichikawa; Akira Terasaki, Utsunomiya, all of Japan

[73] Assignee: Kabushiki Kaisha Toshiba, Kawasakishi, Japan

[21] Appl. No.: 847,494

[22] Filed: Mar. 12, 1992

[30] Foreign Application Priority Data

Mar. 13, 1991 [JP] Japan .................. 3-048398

[51] Int. Cl.$^5$ .................. F01D 5/10; F04D 29/22
[52] U.S. Cl. .................. 416/186 R; 416/223 B
[58] Field of Search .................. 416/182, 185, 186 R, 416/188, 223 B

[56] References Cited

U.S. PATENT DOCUMENTS

| | | | |
|---|---|---|---|
| 3,642,379 | 2/1972 | Swearingen | 416/186 R |
| 3,756,738 | 9/1973 | Lee | 416/223 B |
| 4,108,570 | 8/1978 | Yamabe | 416/186 R |

FOREIGN PATENT DOCUMENTS

| | | | |
|---|---|---|---|
| 4950 | 1/1977 | Japan | 416/186 R |
| 104002 | 8/1979 | Japan | 416/186 R |
| 60666 | 5/1980 | Japan | 416/186 R |
| 146275 | 11/1980 | Japan | 416/186 R |
| 1006299 | 9/1965 | United Kingdom . | |

OTHER PUBLICATIONS

Patents Abstracts of Japan, vol. 9, No. 272 (M-425) [1995]. 30th Oct. 1985; & JP-A-60 116 874 (Toshiba K.K.) Jun. 24, 1985.

Primary Examiner—Edward K. Look
Assistant Examiner—James A. Larson
Attorney, Agent, or Firm—Foley & Lardner

[57] ABSTRACT

When the trigonometric function of the phase lag of the hydraulic excitation of the runner vanes, which varies in accordance with the combination of the number of runner vanes and the number of guide vanes of a high head pump/turbine, is denoted by $\cos(\theta_R n)$, the thickness of the crown along a circle of a diameter at a mid point of the diameter of the outermost periphery of the runner is denoted by $t_{MC}$, the thickness of the band is denoted by $t_{MB}$, the mean thickness of the crown at the outer peripheral portion of the runner is denoted by $t_C$, the mean thickness of the band is denoted by $t_B$, and the rigidity ratio of the crown and band to the runner vane is denoted by $K_R$ taking the rigidity of the runner vane as a reference, the moment coefficient $C_{MO}$ which is a function of $\cos(\theta_R N)$ and the rigidity ratio $K_R$ is selected to be less than 0.5 in accordance with the value of $\cos(\theta_R n)$, and relations $t_C/t_{MC} \leq 1$ and $t_B/t_{MB} \leq 1$ are selected when the value of $\cos(\theta_R m)$ is positive and relations $t_C/t_{MC} \leq 1$ and $t_B/t_{MB} \leq 1$ are selected when the value of $\cos(\theta_R n)$ is negative.

2 Claims, 10 Drawing Sheets

FIG. 16 ially, a runner of a flat and
HIGH HEAD PUMP-TURBINES

BACKGROUND OF THE INVENTION

This invention relates to a high head pump-turbine having a unitary runner made up of a rigid combination of a circular plate shaped crown (upper plate), a band (lower plate), and a plurality of runner vanes which are arranged to form a circular vane cascade between the crown and band, wherein the flow path height at the outermost periphery between the crown and band is much smaller than the outermost diameter of the runner, and the runner is formed in a flattened state.

Figure 11:
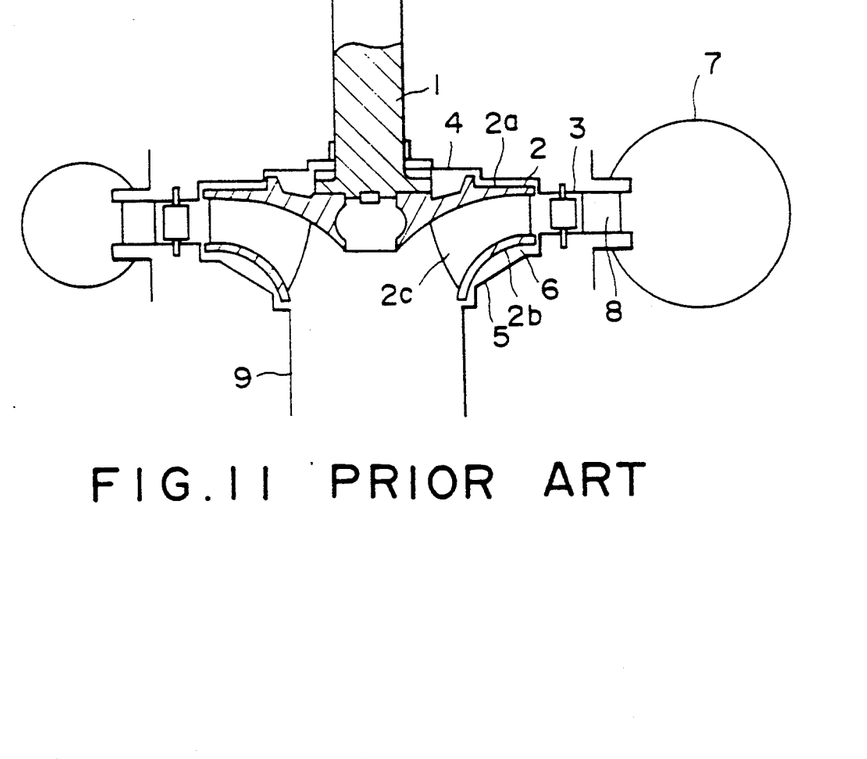
FIG. 11 is a vertical sectional view showing a diagrammatic construction of a conventional high head pump/turbine.
Figure 12:
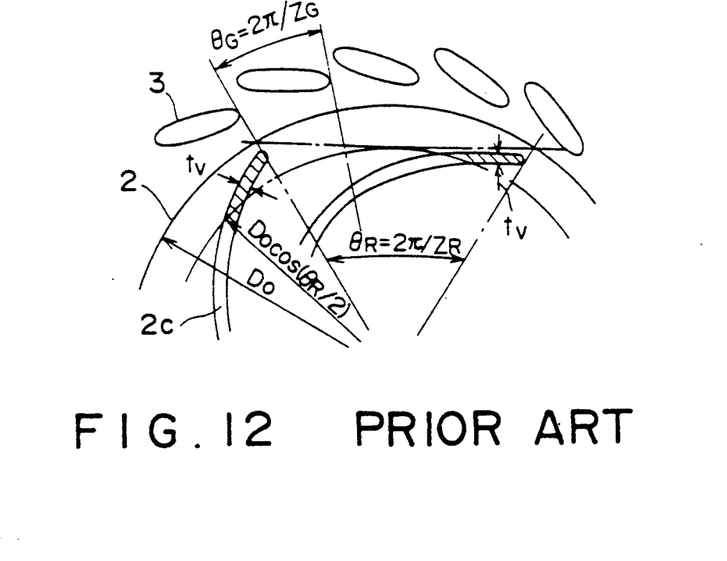
FIG. 12 is a plan developmental view showing relative arrangement of the runner vanes and guide vanes.
Figure 13:
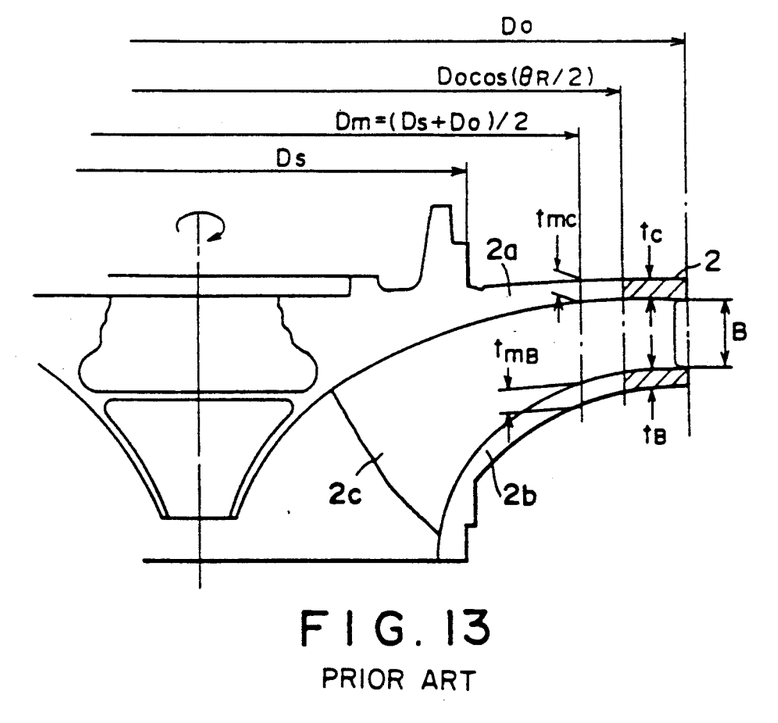
FIG. 13 is a vertical sectional view showing a runner portion of a high head pump-turbine.
Figure 14:
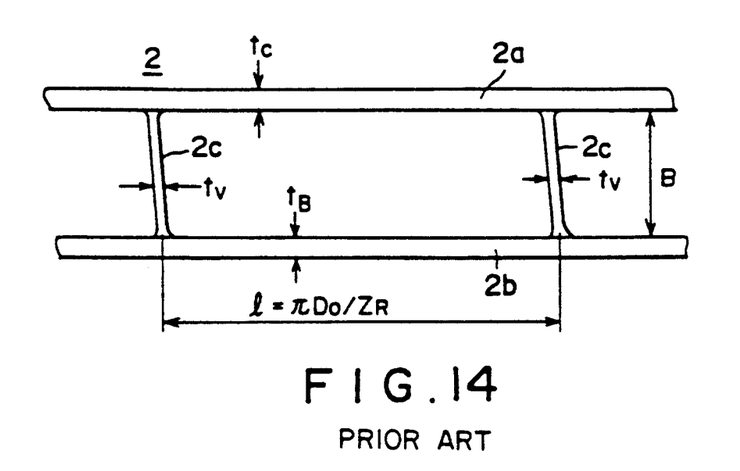
FIG. 14 is a developmental view of a runner portion between two adjacent runner vanes as seen from the outer periphery side.

FIG. 11 of the accompanying drawings shows a general construction of a conventional high head pump-turbine. A runner 2 is secured to the lower end of a main shaft 1 which is directly connected to a generator/motor (not shown). About the runner 2 are disposed a plurality of guide vanes 3 arranged to form a stationary circular vane cascade as shown in FIG. 12. As shown in FIGS. 13 and 14, the runner 2 is formed as an integral structure including a rigid combination of a circular disc shaped crown 2a, a band 2b and a plurality of runner vanes 2c arranged as a moving circular vane cascade. The upper portion of runner 2 is covered by an upper cover 4, while the lower portion of runner 2 is covered by a lower cover 5, and a runner chamber 6 is defined between the upper and lower covers 4 and 5 for accommodating the runner 2.

When the pump-turbine is used as a turbine, high pressure water is admitted into a spiral casing 7 provided to encompass the runner 2 via stay vane 8, and guide vanes 3 to flow into the runner chamber 6. The water flows uniformly from the outside around the outer periphery of runner vanes 2c, and then flows radially inwardly through peripheral inlet paths defined between these runner vanes 2c, thereby rotating the runner 2. Thereafter, the water is discharged to the outside from the lower end of the main shaft 1 through a draft tube 9.

In a high head pump-turbine installed in a high head pumped storage power station usually having an operating head of more than 400 m, for the purpose of operating the pump-turbine at a high speed and with a small quantity of water flow as a result of high head, the runner 2 is required to have a flat characteristic construction such that the height B of the outermost flow passage between the crown 2a and band 2b is less than 0.1 times outermost peripheral diameter $D_O$ of the runner, and that the number $Z_R$ of the runner vanes 2c constituting a moving vane cascade is selected to be in a range of 6 to 8, and that the number $Z_G$ of guide vanes 3 constituting a stationary vane cascade is selected to be in a range of 12 to 32, so that $Z_G$ is larger than $Z_R$.

Figure 15:
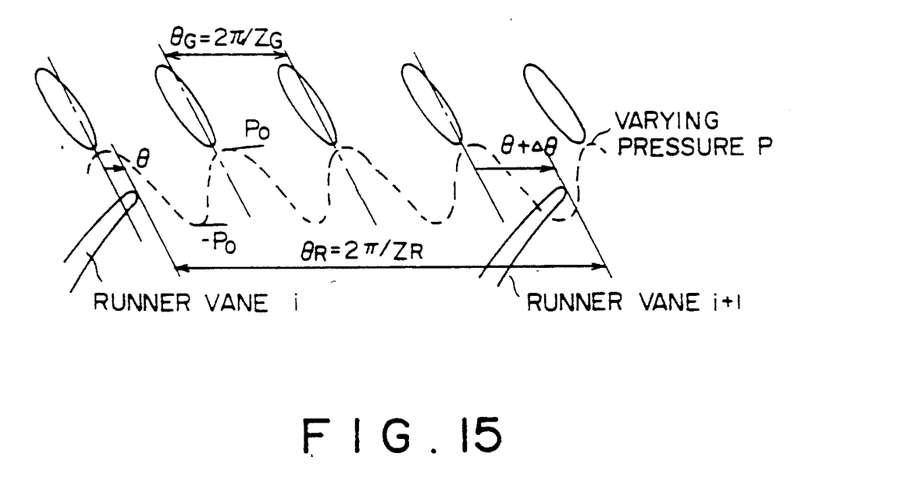
FIG. 15 is a graph showing a periodically varying pressure caused by guide vanes.

During the operation of such a high head pump/turbine, as above described, the high pressure water flowing into the runner chamber 6 through guide vanes 3 constantly collides with the runner vanes 2c so that the leading edges of the runner vanes 2c in the moving vane cascade of the rotating runner 2 regularly and repeatedly pass by the trailing edge portions of the guide vanes 3 and between the vanes 3 in the stationary vane cascade. As a consequence, the runner is subjected to a regularly varying hydraulic exciting force caused by hydraulic interference between the moving vane cascade and the stationary vane cascade (see FIG. 15). Consequently, in the runner 2, due to the hydraulic exciting force mentioned above, the crown 2a and the band 2b are subjected to a disc vibration having nodes at rigid joints between the crown 2a and the band 2b and the runner vanes 2c. Especially, a runner of a flat and disc type of a high head pump-turbine having a height B of the outermost peripheral flow path between the crown and band which is less than 0.1 times the outermost diameter $D_o$, is subjected to an extremely severe vibration giving rise to a large vibration stress.

The frequency $f_H$ of the hydraulic exciting force acting on the runner 2, when it is rotated at a rated speed, is expressed by a relation $Z_G \cdot N_o/60$ (Hz) (where $N_o$ represents the rotational speed (r.p.m.)) because the runner vanes 2c are subjected to $Z_G$ times hydraulic interference corresponding to the number of the guide vanes 3 in the stationary vane cascade during one revolution. In the case where the natural vibration frequency $f_N$ of the runner 2 is close to the frequency fx of the hydraulic excitation, the vibration stress becomes larger due to a resonance phenomenon. Even when such resonance state can be avoided under a condition in which vibration response of the runner 2 with respect to the hydraulic exciting force is large, the vibration stress nevertheless becomes large, thereby hastening runner fatigue which ultimately results in fatigue destruction of the runner 2.

For decreasing the runner vibration stress, a method of avoiding the resonance phenomenon by adjusting the natural vibration frequency $f_N$ of the runner to a level remote from the hydraulic excitation frequency $f_H$ is disclosed in Japanese Laid Open Patent Specification No. 173568/1984. However, this method is not always adequate for the actual state of the runner vibration, and can not attain its objective.

More particularly, in the prior art investigation, the manner in which the hydraulic exciting force acts on the runner and by what mechanism the vibration takes place has not been made clear. For this reason, the fundamental primary factor influencing the runner vibration and the magnitude of the vibration stress have not been correctly understood. Furthermore, it has not been made clear as to in what case the vibration stress increases and countermeasures to prevent this problem have not been developed.

We have clarified the mechanism of the runner vibration and the fundamental primary factor influencing the runner vibration and the magnitude of the vibration stress as disclosed in our technical paper presented in the JSME symposium on fluid engineering No. 900-54, entitled "Vibration Behavior of Runners of High Head Pump-Turbines (first report)", page 40-51 on Aug. 29 and 30, 1990, in Tokyo.

A summary of the technical paper is as follows:

(1) In the past, the runner vibration was considered on the assumption that the runner has the construction of a simple disc. In this paper, however we have considered that the runner consists of a disc shaped crown as a horizontal member, a disc shaped band as another horizontal member and the runner vanes as vertical members arranged to form a circular vane cascade between the two horizontal members, and that the runner is replaced by an annular Rahmen (skeleton structure) formed by a rigid combination of the horizontal and vertical members. This construction is dynamically close to the real state of the runner and thus we have studied the runner vibration.

(2) The rotating runner is subjected to a periodically varying hydraulic exciting force having an amplitude $F_{VO}$ on each runner vane due to the hydraulic interference (see FIG. 16) between the runner vanes 2c and the guide vanes. Denoting the center angle of the vane array spacing of the runner vane cascade by $\theta_R = [2\pi/Z_R)$ and denoting an integer $n[=Z-mZ_R)$ having a minimum absolute value of a relative difference obtained by subtracting a positive integer multiple $m \cdot Z_R$ of $Z_R$ from $Z_G$, the phase lag of hydraulic exciting forces acting upon adjoining two runner vanes is expressed by an equation $\theta_R \cdot n[=(2\pi/Z_R)(Z_G-mZ_R)]$ which is expressed by combined functions of $Z_G$ and $Z_R$.

(3) Due to the effect of the hydraulic exciting forces acting on each of the runner vanes, a dynamic exciting bending moment which varies with the same period as the hydraulic exciting forces is applied to joints of the runner vane to the crown and band. This dynamic exciting bending moment is the product obtained by multiplying by a moment coefficient $C_{MO}$ the maximum producible exciting moment $m_o$ which is the runner fixed end moment arising because when the rigidity of the crown and band is extremely high, only the runner vane side assumes all of the bending deformation that should be shared by the crown, the band, and the runner vanes. Thus, the exciting bending moment of the joint parts on the joint parts on the runner vane side become $M_o$ $(=C_{MO}m_o)$, and the exciting bending moment of the joint parts on the crown and band side becomes $M_{o/2}$.

The moment coefficient $C_{MO}$, that is the moment amplitude ratio $(M_o/m_o)$ in which $m_o$ is taken as a reference can be given by the following theoretical equations by using a trigonometrical function $\cos(_Rn)$ of the phase leg $\theta_{Rn}$ of the hydraulic exciting force and a function of a rigidity ratio $K_R$ of the crown and band by taking runner vanes as a reference.

$$C_{MO} = 2K_R\{1+4(3K_R+1)^2 - 4(3K_R+1) \cos(\theta_{Rn})\} / (2K_R+1)\cdot(6K_R+1) \quad (1)$$

Denoting the thickness ratio of the crown and band to the runner vanes by $t/t_v$ and the sectional secondary moment ratio by $I/I_v$, the rigidity ratio $K_R$ of the crown and band to the runner vanes can be calculated by the following equation.

$$K_R = (I/I_v)(Z_RB/\pi D_o) \quad (2)$$
$$= (t/t_v)^3(Z_RB/\pi D_o)$$

These equations show that $C_{MO}$ increases when the thicknesses of the crown and band are increased to increase $K_R$ and that when $K_R$ is made to be extremely large, $C_{MO}$ becomes 1 and $M_o$ becomes the maximum value of $m_o$.

(4) Due to the action of the dynamic moment at the joints, the crown and band between the runner vanes accompany a disc vibration with displacement in the direction of the axis of the runner rotation wherein the joints of the crown and band to the runner vanes act as a node. Then, at each joint, vibration stress proportional to the exciting bending moment is generated.

(5) Where the damping ratio $||$ of the vibration $(c/2(mk)^{\frac{1}{2}}$, where c represents a viscosity damping coefficient, m represents mass and k a spring constant) is made to be constant,, the magnitude of the vibration stress amplitude $\Delta\sigma$ varies in direct proportion to a moment coefficient $C_{MO}$ $(=M_o/m_o)$ representing the magnitude of the dynamic bending moment $M_o$. The basic influencing factors on $C_{MO}$ are a phase lag $\theta_{Rn}$ between the hydraulic excitations acting on adjoining two runner vanes and the rigidity ratio $K_R$ of the crown and band to the runner vanes. By decreasing $K_R$ and by keeping the phase lag $\theta_{Rn}$ to be adequate, $C_{MO}$ can be decreased. Then the vibration stress $\Delta\sigma$ can be decreased in direct proportion to $C_{MO}$.

(6) Where the effect of the damping ratio of the vibration is taken into consideration, as the rigidity ratio $K_R$ decreases from a large value caused by the decrease of $K_R$ due to a decrease of the thicknesses of the crown and band, the damping ratio $\xi$ tends to increase due to the attenuation of the spring constant so that the vibration stress amplitude $\Delta\sigma$ decreases to a small value less than a decreased level in direct proportional to the decrease of $C_{MO}$.

SUMMARY OF THE INVENTION

It is therefore an object of this invention to provide a novel pump-turbine for use with a high head, which has a small runner vibration response due to the hydraulic exciting force, low runner vibration stress, and a high safety.

Another object of this invention is to provide a novel pump-turbine for use with a high head capable of holding at an optimum state, the phase relation of hydraulic exciting force on the runner by suitably combining $Z_R$ and $Z_G$ so as to decrease the dynamic exciting bending moment, maintaining the rigidity of the principal vibrating members in a specific range in accordance with the phase relation of hydraulic exciting forces, and decreasing the amplitude of the vibration stress to a low level.

According to this invention, there is provided a high head pump/turbine having a flat pump-turbine runner wherein the height B of flow paths at the outermost peripheral portion between a runner crown and band is much smaller than the diameter $D_O$ of the outermost periphery, characterized in that, when the minimum integer of the absolute value of a difference obtained by subtracting a positive variable m times the number $Z_R$ of runner vanes from the number $Z_G$ of guide vanes is denoted by $n=Z_G-mZ_R$, the center angle of the spacing of the runner vane cascade is denoted by $\theta_R$, the phase lag between hydraulic exciting forces acting upon two adjoining runner vanes is denoted by $\theta_{Rn}$; the trigonometric function of the phase lag between the hydraulic exciting forces of two adjoining runner vanes varying in accordance with the combination of the number of runner vanes and the number of guide vanes, is denoted by $\cos(\theta_{Rn})$; the crown thickness along the circle of the mean diameter at the point midway between the outermost peripheral diameter of the runner and the maximum diameter of the outlet sealing portion on the inner periphery side of the runner is denoted by $t_{MC}$, the thickness of the band at the same mean diameter is denoted by $t_{MB}$, the mean thickness of the crown at a portion on the outside of a circle inscribing the chord of a sector having a center angle $\theta_R$ on a circle having the outermost peripheral diameter of the runner is denoted by $t_C$, the mean thickness of the band is denoted by $t_B$, and the rigidity ratio of the crown and band to the runner vanes is denoted by $K_R$ by taking the rigidity of the runner vanes as a reference, the rigidity ratio $K_R$ is so determined such that a moment coefficient $C_{MO}$ which is a function of $\cos(\theta_{Rn})$, and the rigidity ratio $K_R$ become less than 0.5 in accordance with the value of $\cos(\theta_{Rn})$ which varies according to a combination of the number of runner vanes, and the number of guide vanes and at the same time in the case where the value of $\cos(\theta_R n)$ is positive, the relations $t_C/t_{MC} \leq 1$ and $t_B/t_{MB} \leq 1$ are obtained, whereas when the value of $\cos(\theta_R n)$ is negative, relations $t_C/t_{MC} \leq 1$ and $t_B/t_{MB} \leq 1$ are obtained. The high head pump-turbine of this invention operates as follows.

For preventing a runner fatigue destruction caused by the increase of the runner vibration due to action of the hydraulic exciting force, the vibration stress amplitude $\Delta\sigma$ is decreased to a value less than $1\kappa$ of the amplitude of the maximum amplitude stress corresponding to the maximum possible dynamic bending moment $m_o$ whereby the amplitude $\Delta\sigma$ can be reduced to a safe low level with respect to the fatigue strength of the runner. On the other hand, the magnitude of the amplitude $\Delta\sigma$ of the vibration stress at the joints of the runner vanes varies in direct proportion to the moment coefficient $C_{MO}$ indicating the magnitude of amplitude $M_o$ of the dynamic exciting bending moment. Thus, the amplitude of the runner vibration stress can be made amply small by so selecting the rigidity ratio $K_R$ which is a function of the ratio between the mean thickness $t_v$ of the runner vanes and the thickness of the crown or band such that the moment coefficient $C_{MO}$ will be less than 0.5, in accordance with the value $\cos(\theta_R n)$ varying according to the combination of the number of runner vanes and the number of guide vanes. By increasing or decreasing the thickness at the outer peripheral portion of the crown and band with respect to the thickness at the central portion, in accordance with the value of $\cos(\theta_R n)$, the natural frequency of the runner can be varied, thereby avoiding a resonance state with a hydraulic excitation frequency.

DESCRIPTION OF THE PREFERRED EMBODIMENTS

The vibration and the vibration stress of the runner 2 will be considered on the assumption that the runner 2 comprises a crown $2a$ and a band $2b$ as horizontal members and runner vanes $2c$ are vertical members and that the runner 2 is substituted by an annular Rahmen consisting of these respective members whose rigidity is equivalent to that of the runner 2.

Figure 5:
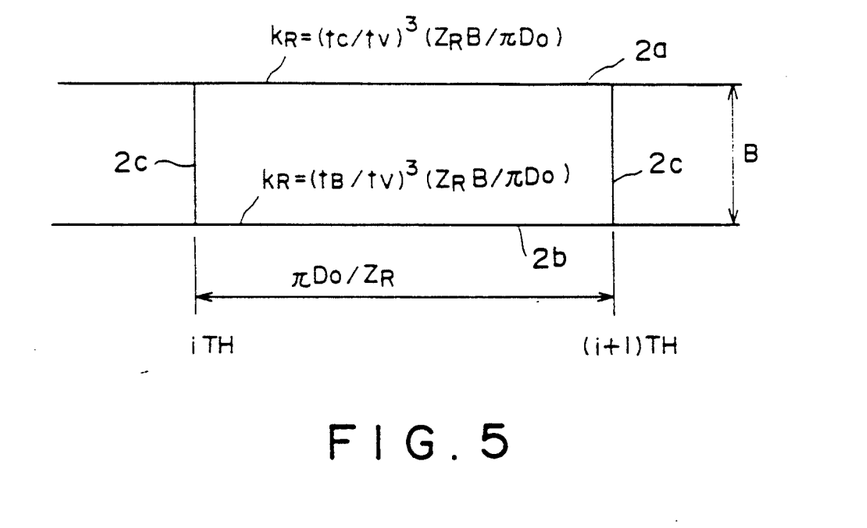
FIG. 5 is a developmental view as viewed from the outer periphery wherein the runner is replaced by an annular Rahmen in which the crown and band take the form of horizontal members and the runner vanes take the form of vertical members.
Figure 6:
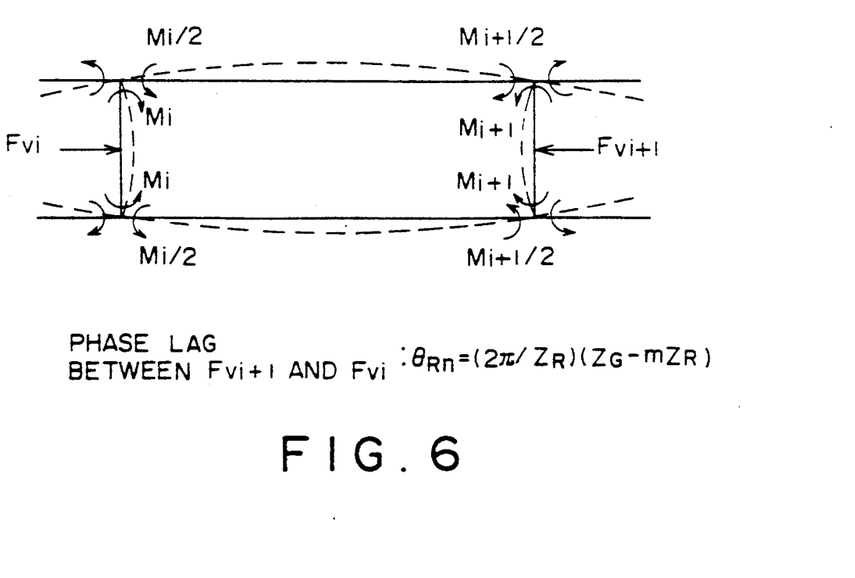
FIG. 6 is a diagram indicating response to vibration of the runner due to hydraulic excitation.
Figure 16:
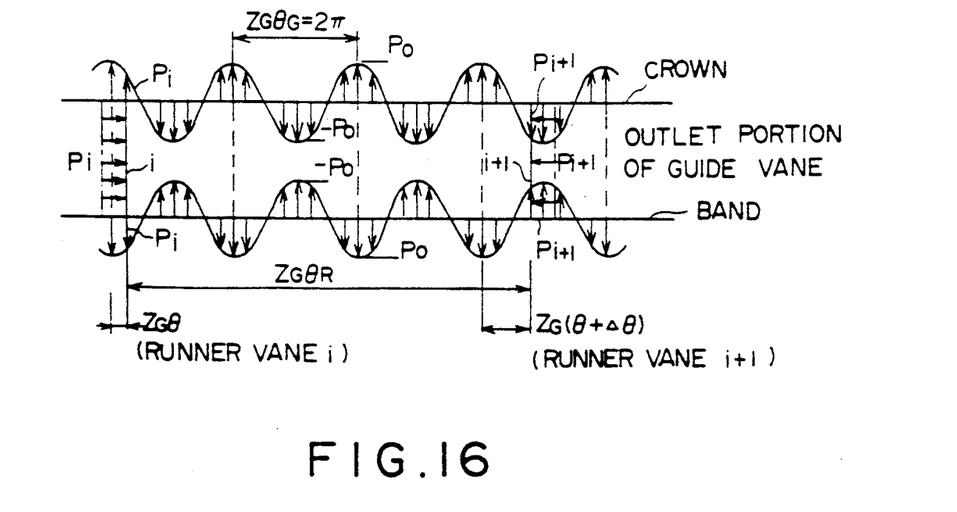
FIG. 16 is a graph explaining the varying pressure acting upon the runner.

FIG. 5 shows a developmental view of the annular Rahmen of runner 2 as seen from the side of the outer periphery and shows a portion between two adjacent runner vanes of ith and $(i+1)$th vanes, while FIG. 6 is a diagram showing a vibration response state of runner 2 caused by the vibration due to hydraulic exciting forces. Each of the runner vanes $2c$ is subjected to a hydraulic exciting force due to an effect of a periodically varying pressure caused by a hydraulic interference of a guide vane cascade, as shown in FIG. 16. More particularly, the ith runner vane and $(i+1)$th runner vane are respectively subjected to hydraulic exciting forces expressed by $F_{vi}=F_{vo}\cos(Z_G\theta)$ and $F_{vi+1}=F_{vo}\cos(Z_G\theta+\theta_R n)$ corresponding to respective phases $Z_G\theta$, $Z_G\theta+\theta_R n$ of respective runner vanes, where Fvo represents the maximum hydraulic exciting force. As a consequence, these hydraulic exciting forces $F_{vi}$ and $F_{vi+1}$ cause dynamic bending moments $M_i$, $M_i/2$, $M_{1+1}$ and $M_{i+1}/2$ in the joints of the runner vanes, crown and band, whereby as shown by dotted lines in FIG. 6, the crown $2a$ and band $2b$ between runner vanes are deflected in the direction of the axis of rotation taking the runner vane $2c$ as a node, thus generating a runner vibration with diametrical nodes. When $F_{Vi}$ and $F_{Vi+1}$ have opposite phases, the crown $2a$ and band $2b$ interposed between the runner vanes undergo maximum deflection in the direction of the axis of rotation.

In the runner vibration caused in this manner by hydraulic exciting forces created by the hydraulic interference of the stationary vane cascade on the side of the outer periphery, as shown in FIG. 12, the outer peripheral portion between the outermost periphery of the runner close to the stationary vane cascade and a circle inscribing the chord of a sector of a center angle $\theta_R$ ($=2\pi/Z_R$) on a circle having a diameter of $D_o$ acts as a main vibrating member, and the rigidity ratio $K_R$ of crown $2a$ and band $2b$ to runner vanes $2c$ determined by taking the rigidity of runner vanes 2c as a reference has an influence upon the vibration. This rigidity ratio $K_R$ is calculated by equation (2) described above. More particularly, the rigidity ratio $K_R$ of the crown taking the runner vane portion at the outer periphery as a reference is expressed by $$(t_C/t_V)^3 (Z_R B/\pi D_o)$$

and the rigidity ratio $K_R$ of the band is expressed by $$(t_B/t_V)^3 (Z_R B/\pi D_o)$$

where the symbols are as follows.

$t_C$: means thickness of the crown on the outside of diameter $D_o \cos(\theta_R/2)$ of a circle inscribing the chord of a sector, $t_B$: mean thickness of the band, $t_V$: mean thickness of the runner vanes.

On the other hand, the amplitude $\Delta\sigma$ of the vibration stress at the joints of runner vanes 2c resulting from the runner vibration is proportional to the moment coefficient $C_{MO}$ representing the dynamic exciting bending moment ratio $M_o/m_o$ and greatly influenced by the magnitude of the trigonometric function $\cos(\theta_R n)$ of the phase lag ($\theta_R n$) between the hydraulic exciting forces on adjoining two runner vanes and by the magnitude of the rigidity ratio $K_R$ of the crown 2a and band 2b at the outer peripheral portion.

Figure 1:
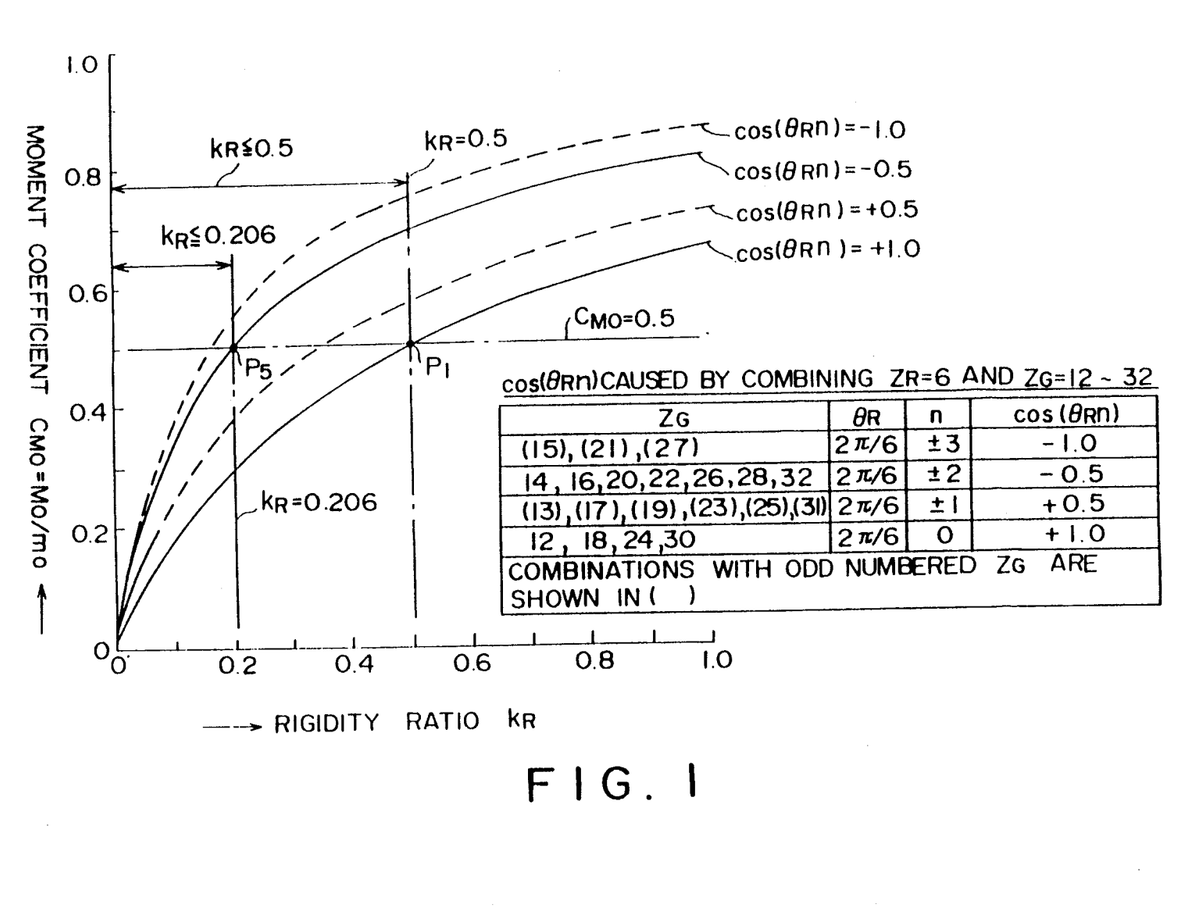
FIG. 1 is a graph showing the case wherein the number of the runner vanes is 6, the relationships among a moment coefficient $C_{MO}$ representing the magnitude of the bending moment acting upon the joints of the runner vanes at the time of vibration of the runner, the trigonometric function $\cos(\theta_R n)$ of the phase lag of the hydraulic excitations acting upon two adjoining runner vanes, the trigonometric function $\cos(\theta_R n)$ being a factor that influences $C_{MO}$ and the rigidity ratio $K_R$ of the crown and band to the runner vanes taking the rigidity of the runner vanes as a reference.
Figure 2:
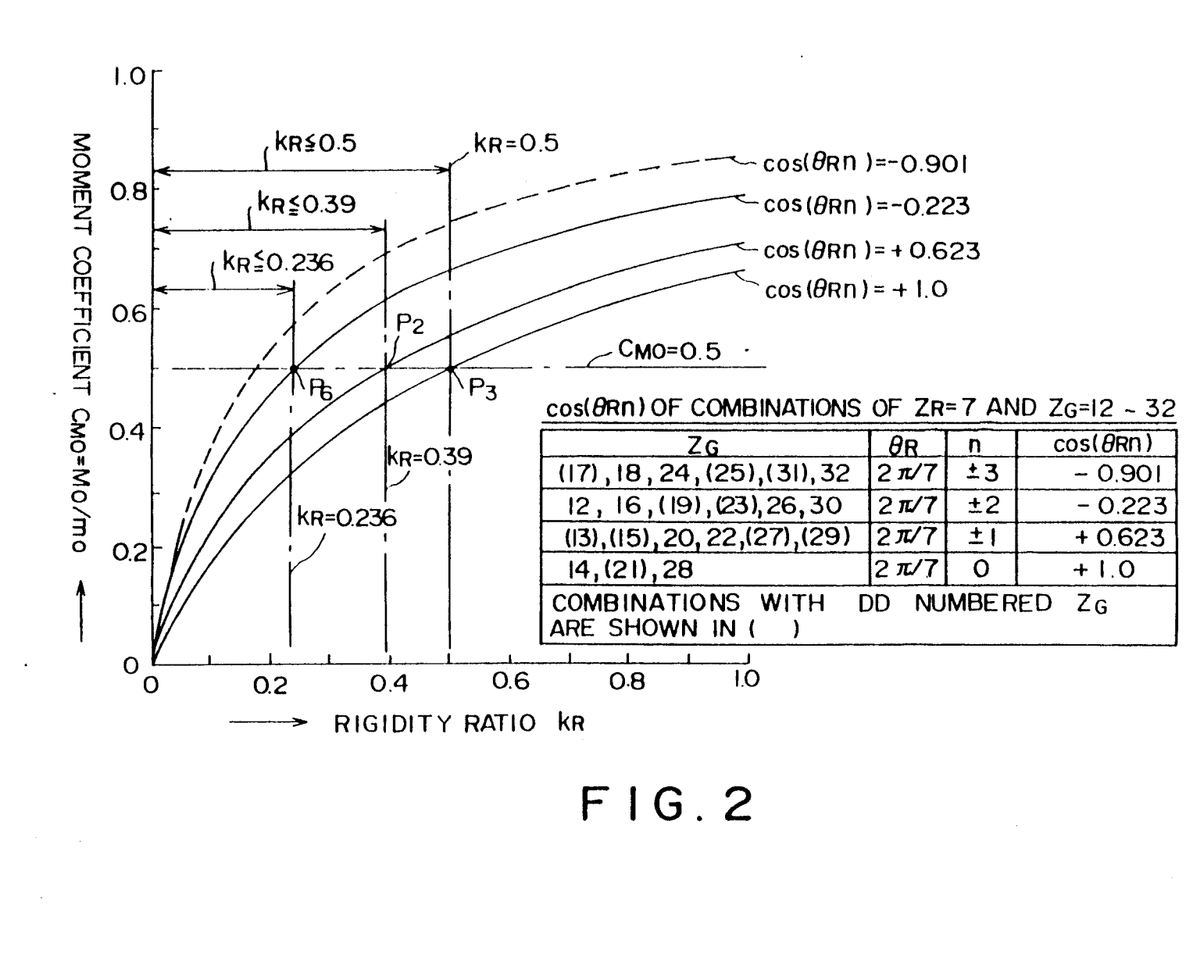
FIG. 2 is a graph showing the relation among $C_{MO}$, $\cos(\theta_R n)$ and $K_R$ where the number of the runner vanes is 7.
Figure 3:
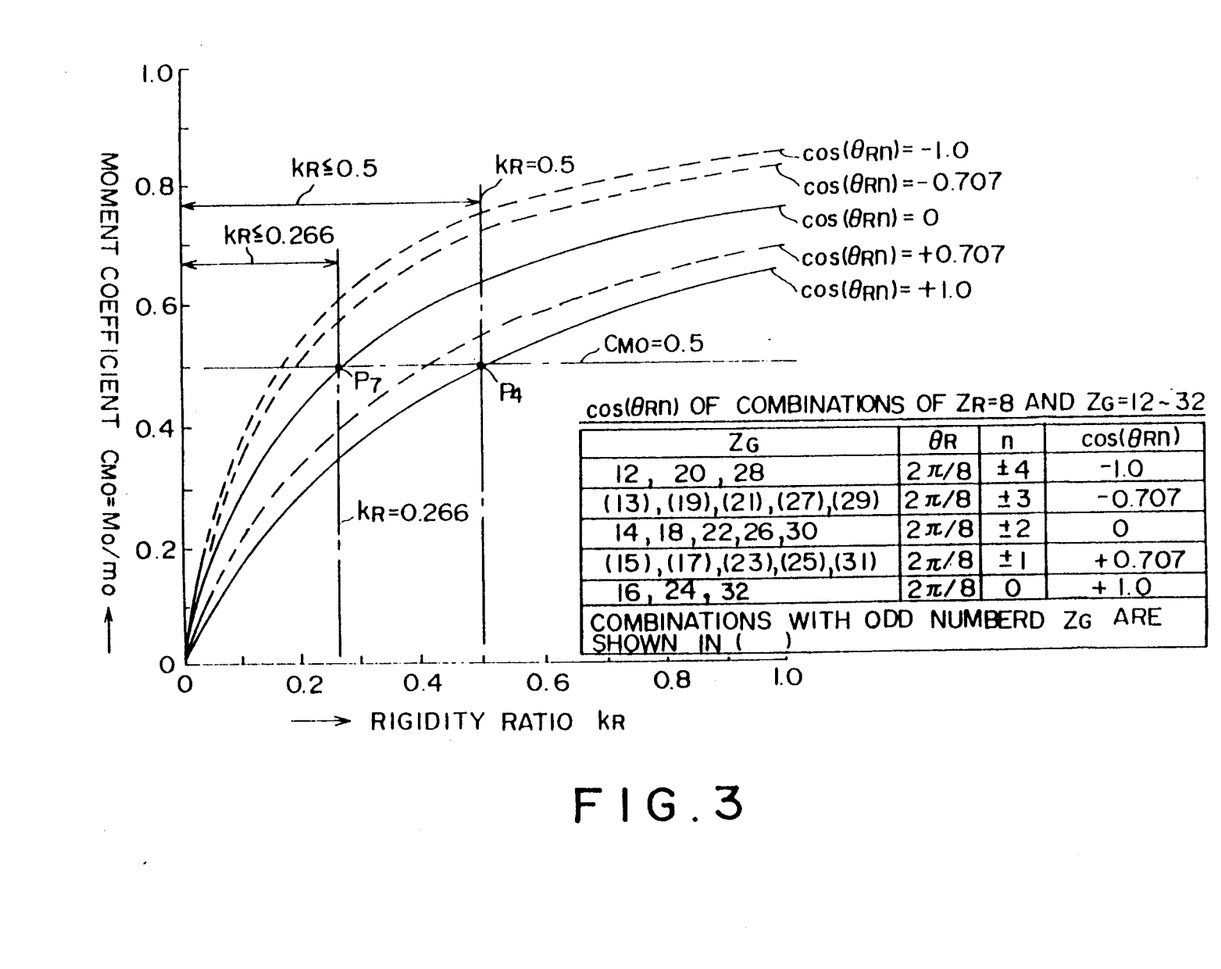
FIG. 3 is a graph showing the relation among $C_{MO}$, $\cos(\theta_R n)$ and $K_R$ where the number of runner vanes if 8.

When the degree of influence of the magnitude of $\cos(\theta_R n)$ which varies depending upon the combination of $Z_R$ and $Z_G$ of the magnitude of the rigidity ratio $K_R$ upon the moment coefficient $C_{MO}$, is determined from the relative equations indicating the relationships of $C_{MO}$ with $K_R$ and $\cos(\theta_R n)$ as functions described above, a combination of $Z_R = 6$ and $Z_G = 12 \sim 32$ in the practical range can be shown as in FIG. 1, a combination of $Z_R = 7$ and $Z_G = 12 \sim 32$ can be shown as in FIG. 2, and a combination of $Z_R = 8$ and $Z_G = 12 \sim 32$ can be shown in FIG. 3. As can be noted from FIGS. 1-3, $C_{MO}$ has a relative relation such that the value of $C_{MO}$ becomes large when $\cos(\theta_R n)$ has a value in the negative range and small when $\cos(\theta_R n)$ has a value in the positive range. Further, there is a relative relation such that as $K_R$ becomes large $C_{MO}$ becomes large and vice versa.

Figure 4:
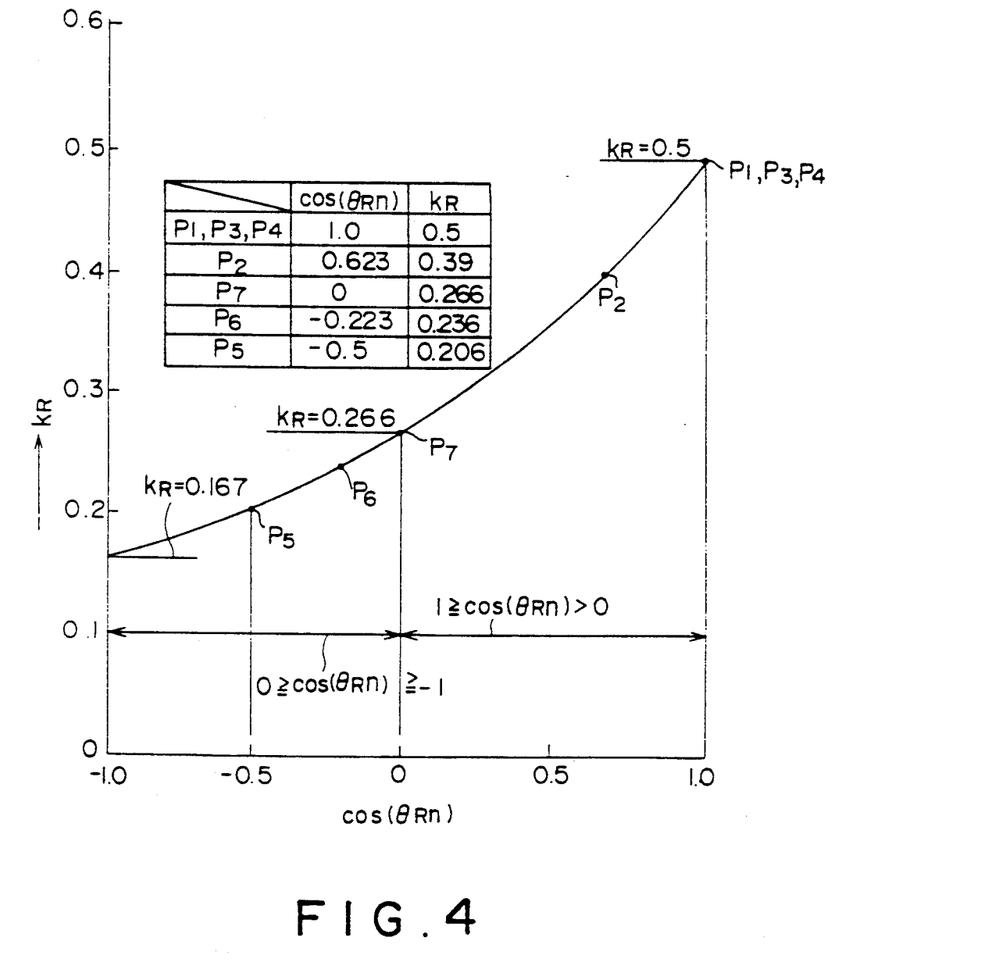
FIG. 4 is a graph showing the relation between $K_R$ corresponding to the upper permissible value of $C_{MO}$ and $\cos(\theta_R n)$.

To decrease the vibration stress amplitude $\Delta\sigma$ to a low level of less than $\frac{1}{2}$ of the maximum vibration stress amplitude $\Delta\sigma_o$ corresponding to the maximum dynamic bending moment $m_o$ described above, which is safe from the standpoint of fatigue strength, the magnitude of the moment coefficient $C_{MO}(=M_o/m_o)$ shown in FIGS. 1~3 must be decreased to a value of less than 0.5. The relation between $\cos(\theta_R n)$ corresponding to the upper limit permissible value 0.5 of $C_{MO}$ and $K_R$ can be shown in FIG. 4. From these relationships, it is to be noted that by selecting a rigidity ratio $K_R$ from equation (1) representing a function of $\cos(\theta_R n)$ and the rigidity ratio $K_R$ to be such a value to maintain the moment coefficient $C_{MO}$ less than 0.5, in accordance with the value of $\cos(\theta_R n)$ which varies according to the combination of the number of runner vanes $Z_R$ and the number of guide vanes $Z_G$, it is possible to decrease the vibration of the runner to a safe low level.

By selecting the thicknesses of the crown and band at values such that the rigidity ratio $K_R$ is less than 0.5 when $\cos(\theta_R n) = 1$ which is determined by the combination of $Z_R$ and $Z_G$ shown in FIGS. 1~3 and that the rigidity ratio $K_R$ is less than 0.206 when $\cos(\theta_R n) = -0.5$, it is possible to hold the value of $C_{MO}$ at a value less than 0.5, thereby decreasing the vibration stress amplitude $\Delta\sigma$ to a safe low level.

In the case of a combination of $Z_G$ and $Z_R$ wherein $\cos(\theta_R n)$ is in a positive range, the value of $C_{MO}$ is smaller than the value of $C_{MO}$ when $\cos(\theta_R n) < 0$. Even when the rigidity ratio is made relatively large, it is easy to maintain $C_{MO}$ at a value less than 0.5. Thus, by gradually increasing the thicknesses of the crown 2a and band 2b from the center portion in a manner such that the thicknesses $t_C$ and $t_B$ at the peripheral portion of the crown 2a and band 2b can be expressed by relations $t_C/t_{MC} \geq 1$ and $t_B/t_{MB} \geq 1$ respectively, where $t_{MC}$ and $t_{MB}$ represent the thicknesses of the crown and band at the center portion and $t_C$ and $t_B$ represent the mean thicknesses of the outer peripheral portions, it is possible to increase the number of natural frequency of the runner 2, thereby avoiding the resonance of the natural frequency $f_N$ of the runner with the frequency $f_H$ of the hydraulic excitation acting on the runner.

In the case of a combination of $Z_G$ and $Z_R$ wherein $\cos(\theta_R n)$ is in a negative range, the value of $C_{MO}$ is larger than the value of $C_{MO}$ when $\cos(\theta_R n) > 0$ by gradually decreasing the thicknesses of the crown 2a and band 2b from the central portion such that the ratio of the thicknesses at the peripheral portion to the thicknesses at the central portion of the crown 2a and band 2b would be respectively expressed by relations $t_C/t_{MC} \leq 1$ and $t_B/t_{MB} \leq 1$. Then it becomes possible to avoid resonance of the natural vibration frequency $f_N$ with the frequency $f_H$ of the hydraulic excitation.

Embodiment 1

Figure 7:
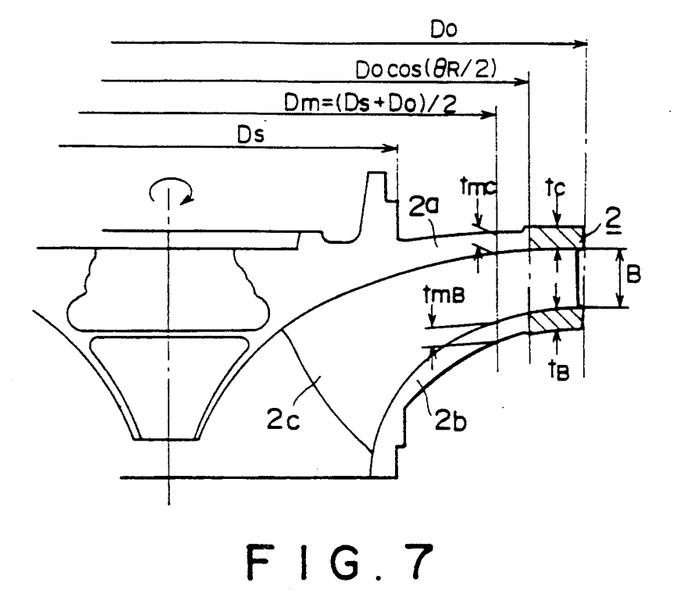
FIG. 7 is a vertical sectional view showing essential portions of the runner constructed according to one embodiment of this invention.

In the case of a combination of $Z_R = 7$ and $Z_G = 20$, the value of $\cos(\theta_R n)$ is $+0.623$ as shown in FIG. 2, and the runner can be constructed to have a value of $C_{MO}$ of less than 0.5, when the following conditions are established as shown in FIG. 7.

$B/D_o \leq 0.1$, $t_C/t_{MC} \geq 1$, $t_B/t_{MB} \geq 1$, $(t_C/t_V)^3 (Z_R B/\pi D_o) \leq 0.39$, $(t_B/t_V)^3 (Z_R B/\pi D_o) \leq 0.39$.

Figure 9:
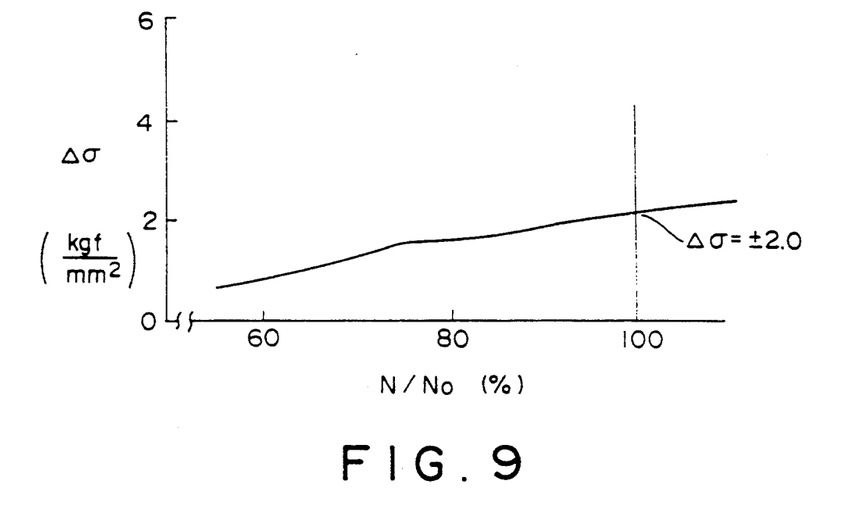
FIG. 9 is a graph showing the test result of the vibration stress amplitude at the joints of runner vanes embodying this invention.

As a consequence, as the result of measurement (shown in FIG. 9), when the rotational speed N (r.p.m.) is varied, the vibration stress amplitude $\Delta\sigma$ of the joints of runner vanes can be decreased to a safe low level described above. This proves that this construction is sufficiently safe with respect to the permissible stress 5 kgf/mm 2 for the runner fatigue strength. Further, since the natural frequency $f_N$ has been increased, it has been proved that no resonance occurs near the rated rotating speed Nc (r.p.m.) ($f_N/f_H > 1$).

Embodiment 2

Figure 8:
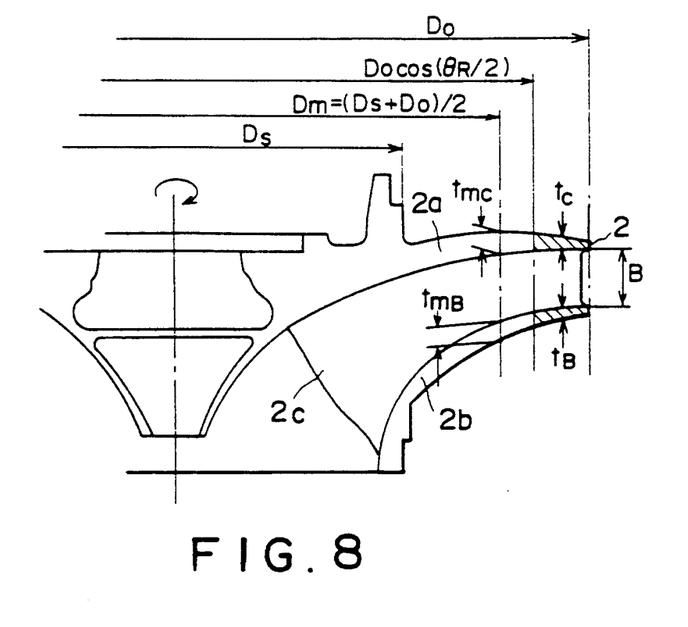
FIG. 8 is a vertical sectional view showing essential portions of the runner according to another embodiment of this-invention.

In the case of a combination of $Z_R = 6$ and $Z_G = 20$, as shown in FIG. 1, the value of $\cos(\theta_R n)$ becomes $-0.5$ and the runner can be constructed to have a value of $C_{MO}$ of less than 0.5 when the following conditions are established as shown in FIG. 8.

$B/D_o \leq 0.1$, $t_C/t_{MC} \leq 1$, $t_B/t_{MB} \leq 1$, $$(t_C/t_r)^3(Z_R B/\pi D_o) \leq 0.206 \text{ and}$$

$$(t_B/t_r)^3(Z_R B/\pi D_o) \leq 0.206.$$

Figure 10:
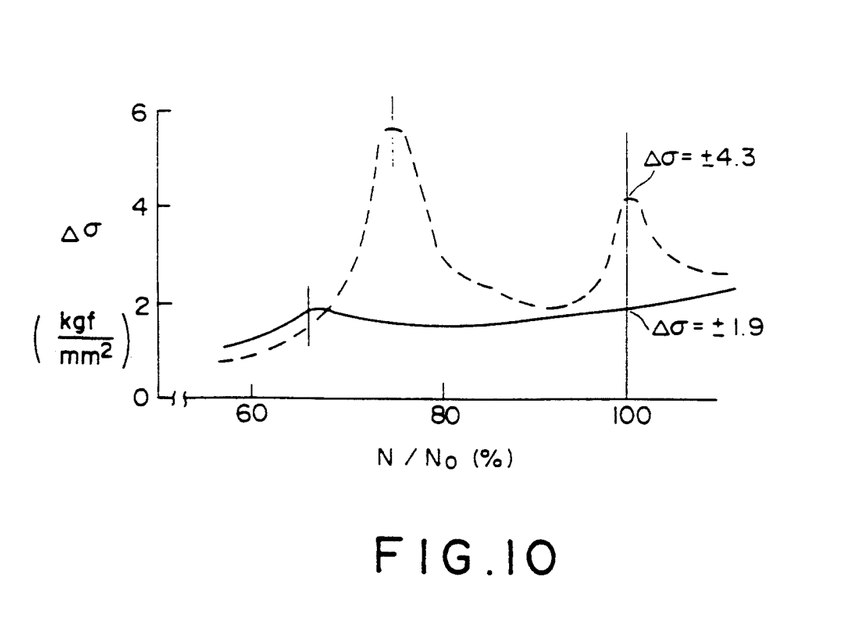
FIG. 10 is a graph showing the test result of the vibration stress amplitude at the joints of the runner vanes according to the another embodiment of this invention.

FIG. 10 shows the result of measurement of the vibration stress amplitude $\Delta\sigma$ at the joints of the runner vanes when the number of revolutions (r.p.m.) is varied. In FIG. 10, the broken line shows the result of measurement when the thickness ($t_C$, $t_B$) of the outer peripheral portion is made larger than that of this invention. The vibration stress amplitude $\Delta\sigma$ of this invention is less than that shown by dotted lines as shown by a solid line and decreased to the safe low level as has been described above which proves that this level is ample with respect to the permissible stress 5 kgf/mm² for the runner fatigue strength. Furthermore, the natural frequency $f_N$ is also decreased and it was found that there is no resonance ($f_N/f_H<1$) near the rotating speed $N_O$. rated Since the pump-turbine is constructed as above described, by suitably combining $Z_R$ and $Z_G$ the phase relation of the hydraulic excitation is maintained at an adequate state, so that the dynamic moment due to the hydraulic excitation can be reduced, and the rigidity of the main vibrating parts at the outer peripheral portion of the runner can be maintained in a specific range in accordance with the phase relation of the hydraulic excitation. Further, it is possible to decrease the amplitude of the dynamic bending moment to be less than ½ of the amplitude of the maximum possible dynamic bending moment, thereby decreasing the amplitude of the vibration stress to a safe low level. As a consequence, it is possible to make adequate the fundamental influencing factors of the runner vibration, thereby effectively decreasing the vibration stress of the runner to a safe value.

What is claimed is:

1. A high head pump-turbine comprising:
a flat pump-turbine runner wherein a height B of flow paths defined at an outermost peripheral portion thereof between a runner crown and a band is smaller than a diameter $D_o$ of an outermost periphery, wherein, when a minimum integer of an absolute value of a difference obtained by subtracting a positive variable m times a number $Z_R$ of runner vanes from a number $Z_G$ of guide vanes is denoted by $n=Z_G-mZ_R$; a center angle of the spacing of a runner vane cascade is denoted by $\theta_R$; a phase lag between hydraulic exciting forces acting upon two adjoining runner vanes is denoted by $\theta_R n$; a trigonometric function of the phase lag between the hydraulic exciting forces of two adjoining runner vanes varying in accordance with the combination of the number of runner vanes and the number of guide vanes is denoted by $\cos(\theta_R n)$; a crown thickness along a circle of a mean diameter at a point midway between an outermost peripheral diameter of the runner and a maximum diameter of an outlet sealing portion of an inner periphery side of the runner is denoted by $t_{MC}$; a thickness of the band at the means diameter is denoted by $t_{MB}$; a mean thickness of the crown at a portion on the outside of a circle inscribing the chord of a sector having a center angle $\theta_R$ on a circle having the outermost peripheral diameter of the runner is denoted by $t_c$; a mean thickness of the band is denoted by $t_B$; and a rigidity ratio of the crown and the band to the runner vanes is denoted by $K_R$ by taking a rigidity of the runner vanes as a reference, the rigidity ratio $K_R$ is so determined that a moment coefficient $C_{MO}$, which is a function of $\cos(\theta_R n)$ and the rigidity ratio $K_R$, becomes less than 0.5 in accordance with the value of $\cos(\theta_R n)$ which varies according to the combination of the number of runner vanes and the number of guide vanes, and at the same time in the case where the value of $\cos(\theta_R n)$ is positive, the relations $t_C/t_{MC} \geq 1$ and $t_B/t_{MB} \geq 1$ are obtained, whereas when the value of $\cos(\theta_R n)$ is negative, the relations $t_C/t_{MC} \leq 1$ and $t_B/t_{MB} \leq 1$ are obtained.

2. A high head pump-turbine comprising:
a flat runner having a diameter of $D_o$ at an outermost periphery thereof, an outlet sealing portion on an inner side of the runner, a crown, a band portion, and a plurality of runner vanes forming a runner vane cascade, the runner vanes connecting the crown to the band portion such that a plurality of flow paths are formed, each of said flow paths being defined between the crown, the band portion, and adjacent runner vanes; and
a guide vane cascade including a plurality of stationary guide vanes disposed around the runner;
wherein a height B of the flow paths at the outermost periphery of the runner between the crown and band portion is smaller than the diameter $D_o$;
wherein, when
(1) a minimum integer n is defined as $$n = |Z_G - mZ_R|$$

where m is a positive variable, $Z_R$ is the number of runner vanes, and $Z_G$ is the number of guide vanes,
(2) a center angle defined between adjacent runner vanes and a center point of the runner is denoted $\theta_R$,
(3) a phase lag between exciting forces acting upon adjacent runner vanes is defined as $\theta_R$,
(4) a trigonometric function of the phase lag varies in accordance with the number of runner vanes $Z_R$ and the number of guide vanes $Z_G$, the trigonometric function defined as $\cos(\theta_R n)$;
(5) a thickness of the crown along a first circle defined by a mean diameter at a point midway between the outermost peripheral portion of the runner and a maximum diameter of the outlet sealing portion is denoted as $t_{MC}$,
(6) a thickness of the band portion at the mean diameter is denoted as $t_{MB}$,
(7) a mean thickness of the crown outside of a second circle inscribing a chord of a sector having a center angle $\theta_R$ is denoted as $t_C$,
(8) a mean thickness of the band portion is denoted as $t_B$, and
(9) a rigidity ratio $K_R$ is the ratio of the rigidity of each of the crown and the band portion to the rigidity of the runner vanes,
the rigidity ratio $K_R$ is determined so that a moment coefficient $C_{MO}$ which is a function of $\cos(\theta_R n)$ and the rigidity ratio $K_R$ is less than 0.5 in accordance with the value of the trigonometric function $\cos(\theta_R n)$ which varies depending upon the number of runner vanes $Z_R$ and the number of guide vanes $Z_G$;
wherein when a value of $\cos(\theta_R n)$ is positive, relationships $t_C/T_{MC} \geq 1$ and $t_B/t_{MB} \geq 1$ are obtained and when a value of $\cos(\theta_R n)$ is negative, relationships $t_C/t_{MC} \leq 1$ and $t_B/t_{MB} \leq 1$ are obtained.

* * * * *